US012747826B2

(12) United States Patent
Lullo et al.

(10) Patent No.: US 12,747,826 B2
(45) Date of Patent: Sep. 29, 2026

(54) MAGNETIC LOCKING DEVICE HOLDER MOUNT

(71) Applicant: Dzine Products, LLC, Addison, IL (US)

(72) Inventors: Nicholas Lullo, Addison, IL (US); Mitchell Martin, Addison, IL (US)

(73) Assignee: Dzine Products, LLC, Addison, IL (US)

( * ) Notice: Subject to any disclaimer, the term of this patent is extended or adjusted under 35 U.S.C. 154(b) by 19 days.

(21) Appl. No.: 18/785,052

(22) Filed: Jul. 26, 2024

(65) Prior Publication Data

US 2026/0029086 A1 Jan. 29, 2026

(51) Int. Cl.
*F16M 13/02* (2006.01)
*H02J 50/10* (2016.01)

(52) U.S. Cl.
CPC ............. *F16M 13/02* (2013.01); *H02J 50/10* (2016.02)

(58) Field of Classification Search
CPC ........ F16M 11/041; F16M 13/02; H02J 50/10
See application file for complete search history.

(56) References Cited

U.S. PATENT DOCUMENTS 8,708,151 B2 4/2014 Whitten et al.
9,185,953 B2 11/2015 Whitten et al.
9,243,739 B2 1/2016 Peters
9,383,774 B2 7/2016 Whitten et al.
9,498,034 B2 11/2016 Whitten et al.
9,592,871 B2 3/2017 Whitten et al.
9,611,881 B2 * 4/2017 Khodapanah ........... F16B 21/06
9,700,114 B2 7/2017 Whitten et al.
9,960,642 B2 * 5/2018 Ozana ........................ H02J 7/02
10,070,707 B2 * 9/2018 Whitten ................. B62J 50/225
10,093,377 B2 10/2018 Whitten et al.
10,112,670 B2 10/2018 Whitten et al.
10,569,717 B2 2/2020 Peters et al.
10,649,492 B2 5/2020 Peters et al.
10,655,656 B2 * 5/2020 Franklin ................ H01R 13/73
10,864,956 B2 12/2020 Whitten et al.
11,239,697 B2 * 2/2022 Min ...................... H02J 7/0044
11,246,233 B2 * 2/2022 Venkatesh ............ H05K 5/0234
11,303,143 B2 4/2022 Taylor et al.
11,585,485 B2 2/2023 Jankura et al.
11,659,916 B2 * 5/2023 Perkins ............... H01M 50/109
235/492
11,722,015 B2 * 8/2023 Walton ................ H02J 7/00034
320/108
11,867,352 B2 * 1/2024 Rasmussen ........... H02J 7/0044
(Continued)

*Primary Examiner* — Bradley Duckworth
(74) *Attorney, Agent, or Firm* — Leech Tishman Fuscaldo & Lampl

(57) ABSTRACT

A holder for an electronic device having a screen and a wireless charging puck has a mount including a first component defining a receptacle for engaging and retaining the electronic device, including a back, sides and an open front. The back defines a circular aperture dimensioned to receive the wireless charging puck, and the aperture is surrounded by magnets and a mechanical locking component. A second component attaches to the back of the first component. The second component defines a receptacle for receiving and retaining the wireless charging puck, and the second component includes magnets and a mechanical locking component engageable with those of first component.

16 Claims, 5 Drawing Sheets

(56) References Cited

U.S. PATENT DOCUMENTS

| | | | | |
|---|---|---|---|---|
| 11,977,412 | B2 * | 5/2024 | Miles | F16M 11/22 |
| 12,040,643 | B2 * | 7/2024 | Karanikos | H02J 50/10 |
| 12,300,837 | B2 * | 5/2025 | Havskjold | H01M 10/425 |
| 2016/0259374 | A1 * | 9/2016 | Breiwa | H01F 7/0247 |
| 2023/0147889 | A1 * | 5/2023 | Lane | H02J 7/0044<br>320/108 |
| 2023/0198301 | A1 * | 6/2023 | Peters | H04B 1/3888<br>320/108 |
| 2023/0208165 | A1 * | 6/2023 | Peters | H02J 7/0042<br>320/108 |
| 2024/0308436 | A1 * | 9/2024 | Yao | F16M 11/041 |
| 2025/0132602 | A1 * | 4/2025 | Wu | H02J 50/90 |
| 2025/0137581 | A1 * | 5/2025 | Fan | F16M 13/022 |

* cited by examiner

Section A-A

MAGNETIC LOCKING DEVICE HOLDER MOUNT

CROSS-REFERENCE TO RELATED APPLICATION n/a

FIELD

The present technology is directed to vehicle mounts for phones.

BACKGROUND

Phones are commonly mounted in vehicles such as cars, trucks, boats, motorcycles, jet-skis, and heavy machinery for the use of GPS, maps, messages, calls, or other applications while driving, operating or riding. Mounting systems exist that can hold a phone so that the screen is easily visible to a driver, operator, or passenger, which allows the phone to be removed from the mount so the phone can be removed from the vehicle. These devices include mechanical and magnetic securing features.

Existing mounting systems, however, do not integrate well with wireless charging cords, plugs and adapters, and they do not include vibration dampening which can be very desirable for most vehicles. Known modular systems stack multiple components together and make the modular mount very thick. A thick mount is undesirable for several reasons other than poor aesthetics. For example, unless a wireless charging unit is placed very close (preferably in contact) with the phone, the charging efficiency can be drastically reduced. Also, a thick mount positions the phone far away from the mounting surface of the vehicle. This limitation is most prevalent with respect to motorcycles and powersport vehicles where mounting space is very limited and positioning of the phone is critical because the phone may block the operator's view of the vehicle's instrumentation.

Further, existing mounting systems that include a mechanical mount to attach a phone have the problem of not allowing the phone to be easily moved between portrait and landscape orientations. These systems require the phone to be removed from the mount and reinserted or remounted in the other orientation. This action is inconvenient at best, and it is nearly impossible if the vehicle operator wants to switch the orientation quickly or with one hand while the vehicle is in motion.

Additionally, phones are more commonly becoming integrated with magnets and wireless charging features to allow them to be easily attached to a magnetic wireless charging mount. Mounts exist to accommodate this new technology. However, a phone that is attached magnetically to a mount can easily fall off due to vibration or other forces while operating the vehicle, but the use of very strong magnets that might better secure the phone makes removal of the phone from the mount difficult.

SUMMARY

The present invention provides both magnetic and mechanical locking features in a mount for an electronic device having a screen and a wireless charging puck. In an exemplary embodiment the mount includes a first component defining a receptacle for engaging and retaining the electronic device, including a back, sides and an open front. The back defines a circular aperture dimensioned to receive the wireless charging puck and is surrounded by a magnets and a mechanical locking component. A second component is attachable to the back of the first component, the second component receiving and retaining the wireless charging puck. The second component includes a second group of magnets and a second mechanical locking component engageable with the first mechanical locking component.

The first group of magnets and the first set of mechanical locking components are disposed around the circular aperture. In one example, four magnets are disposed 90 degrees apart around the circular aperture. The locking components can be disposed between the magnets and around the circular aperture. Similarly, the second group of magnets are disposed around the second receptacle and can include four magnets disposed 90 degrees apart around the second receptacle with a flanges disposed between the magnets around the second receptacle. The mount can include vibration dampeners and an aperture to allow passage of a wire for the wireless charging puck.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

The present invention provides a mount for holding an electronic device, such as a mobile phone in a vehicle, and the mount includes features that allow easy removal of the device while providing a strong and secure mount for the device. The invention also allows for the integration of wireless charging and vibration damping in a compact form factor.

Figure 2:
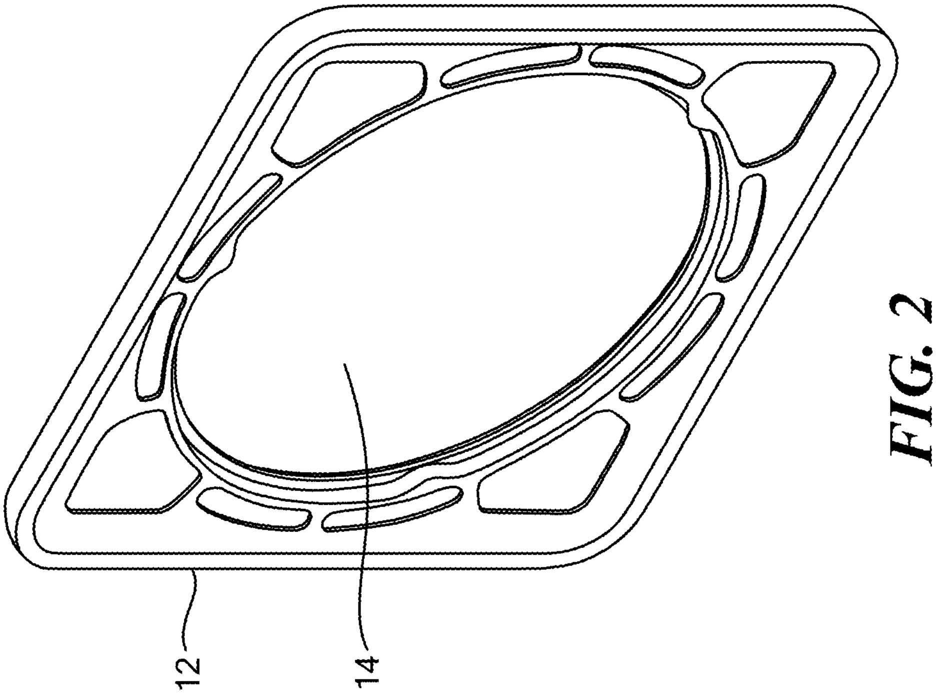
FIG. 2 is a perspective view of the mount element of FIG. 1 that is not included as part of a phone case.
Figure 1:
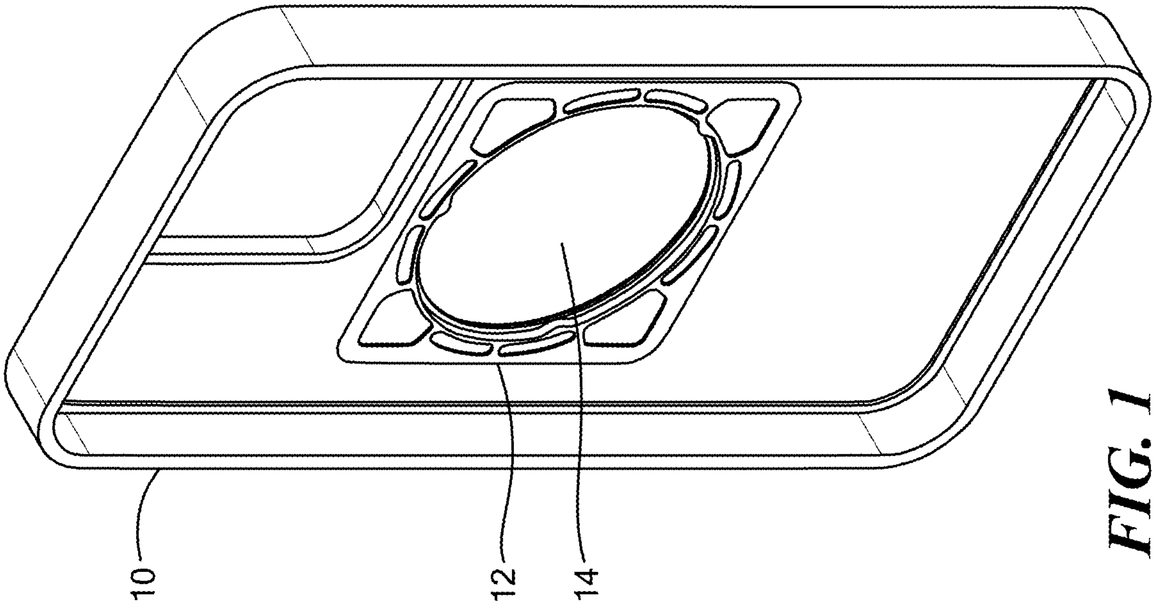
FIG. 1 is a perspective view of a phone case including a mount element in accordance with the invention.

FIG. 1 is a perspective view of a phone case 10 including a first portion or component of a mount element 12 in accordance with the invention. FIG. 2 is a perspective view of the first portion of the mount element 12 of FIG. 1. The first portion of the mount element 12 can be integral with a phone or device case as shown in FIG. 1, or it can be a separate element that is joined directly to the device with an adhesive as shown in FIG. 2.

Figure 3:
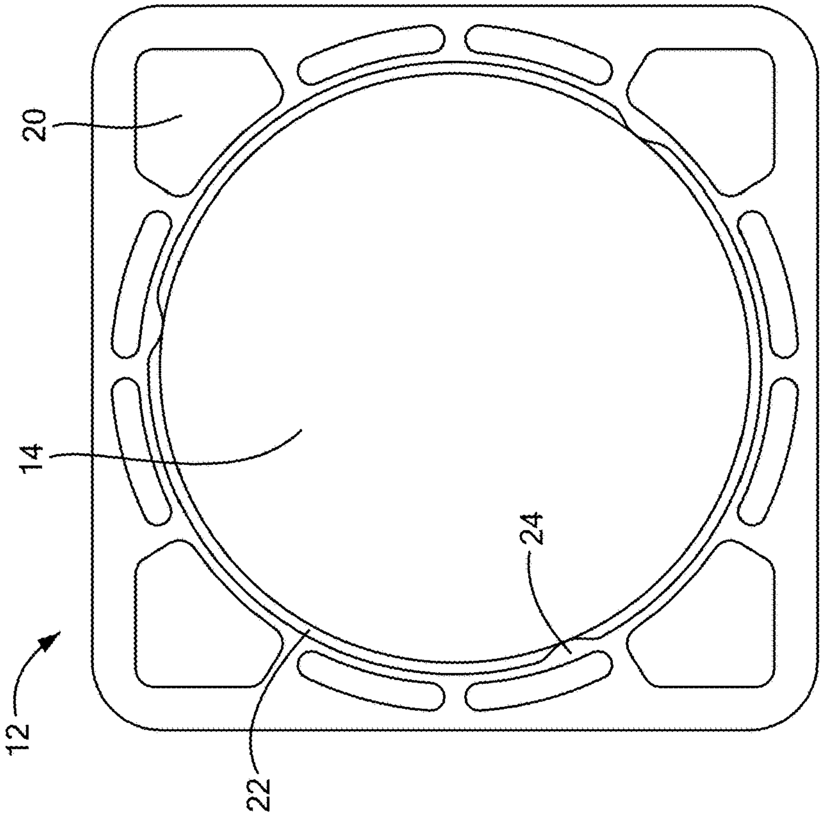
FIG. 3 is a plan view of the mount element of FIG. 1 and FIG. 2.
Figure 6:
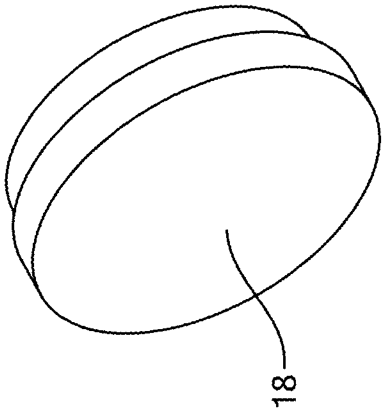
FIG. 6 illustrates an insert that can be placed within the second mount element in place of a charging puck.
Figure 5:
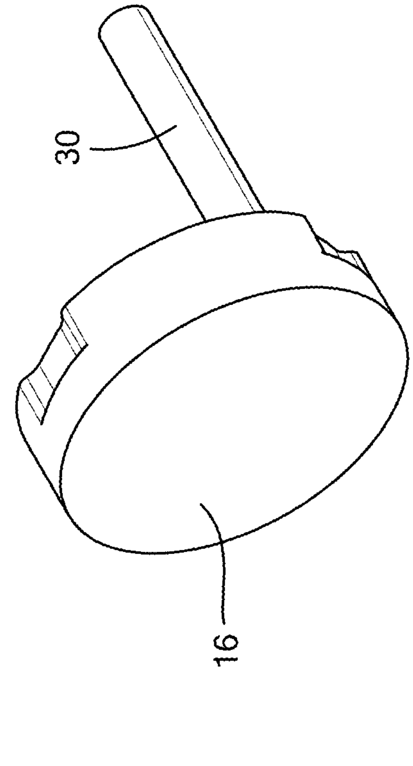
FIG. 5 shows a known wireless charging puck insertable within the second mount element.

FIG. 3 is a plan view of the first portion of the mount element 12 of FIG. 1 and FIG. 2. The first portion or component 12 defines a circular aperture 14 dimensioned to receive a charging face of a wireless charging puck 16 as shown in FIG. 5, or an inoperative insert 18 for non-charging applications as shown in FIG. 6. The first portion of the mount element 12 is square shaped, and a magnet 20 is positioned at each corner. Thus, the magnets 20 are 90 degrees apart from each other. A recessed lip 22 surrounds the aperture 14, and nubs 24 extend over the lip. Three evenly spaced nubs 24 are shown in FIG. 3. The nubs 24 and lip 22 provide a first mechanical locking component.

Figure 4:
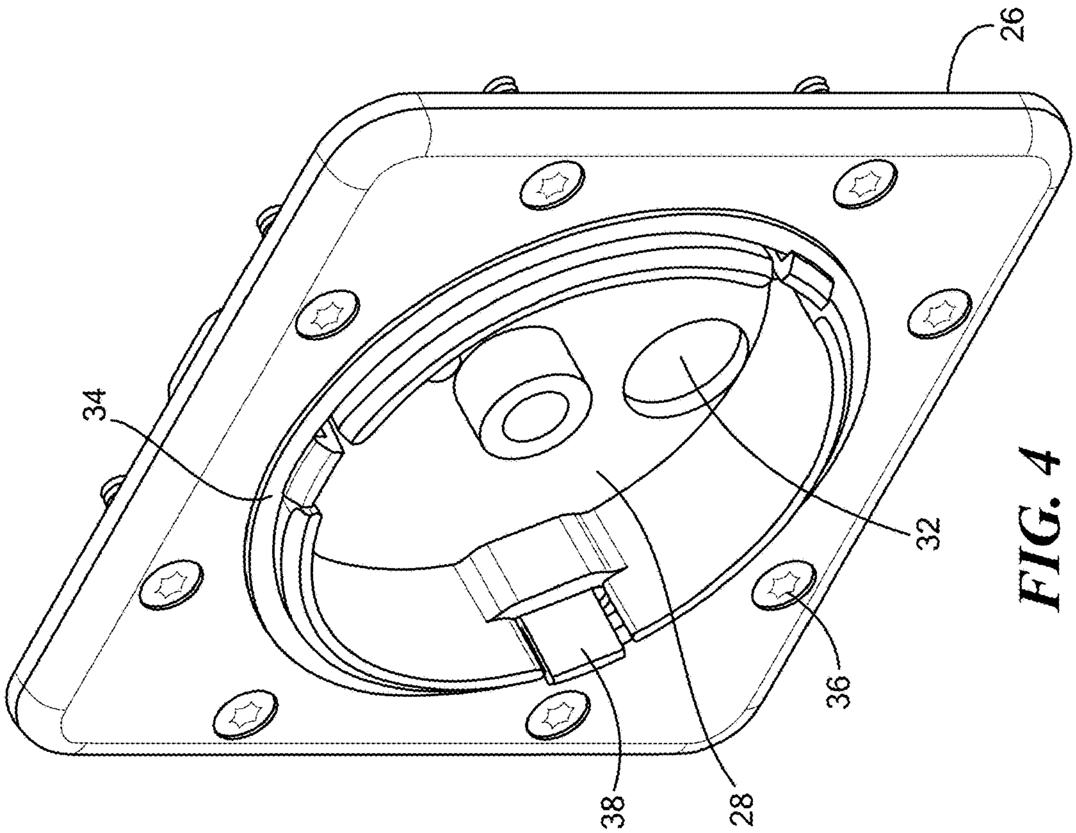
FIG. 4 is a perspective view of a second mount element that joins to the mount element shown in FIGS. 1 and 2.

Turning now to FIG. 4, a second portion of the mount element 26 is shown that is attachable to the back of the first portion of the mount element 12. It defines a receptacle 28 for receiving and retaining the wireless charging puck 16 of FIG. 5 or the inoperative insert 18 of FIG. 6. The wireless charging puck 16 includes a power cable 30, and an aperture 32 is provided through a portion of the receptacle 28 through which the power cable 30 may pass. A lip 34 surrounds the receptacle 28 and magnets 36 are arrayed around the receptacle that comply with the Apple MagSafe/Qi2 standards so the invention can mount with MagSafe/Qi2 mounts not related to the invention.

Mechanical locking components, such as flanges 38 are disposed around the periphery of the receptacle 28 wherein each flange has a portion, such as a free end, that is movable away from the open receptacle. The flanges 38 can be moved toward and away from the periphery of the receptacle 28 and lip 34 and can be hinged, biased, and/or flexible to allow for the movement. When the second portion of the mount element 26 is pressed against the back of the first portion of the mount element 12, the flanges 38 move or flex slightly inward and pass through the circular aperture 14. This can be facilitated by providing the free end of the flanges 38 with a curved or slanted face as shown. The flanges 38 then move or flex slightly outward after the free end of the flanges passes through the aperture until the free end of the flanges overlap the lip 34 thereby inhibiting separation of the first and second portions of the mount element from each other. Additional details of this feature are described with respect to FIGS. 9 and 10. In an alternate configuration the nubs are replaced with cutouts in the lip at three locations around the aperture (not shown). Instead of nubs depressing the flanges to release the phone, the cutouts align with the flanges to allow the flanges to pass through the cutouts as the phone is pulled away from the mount.

Figure 8:
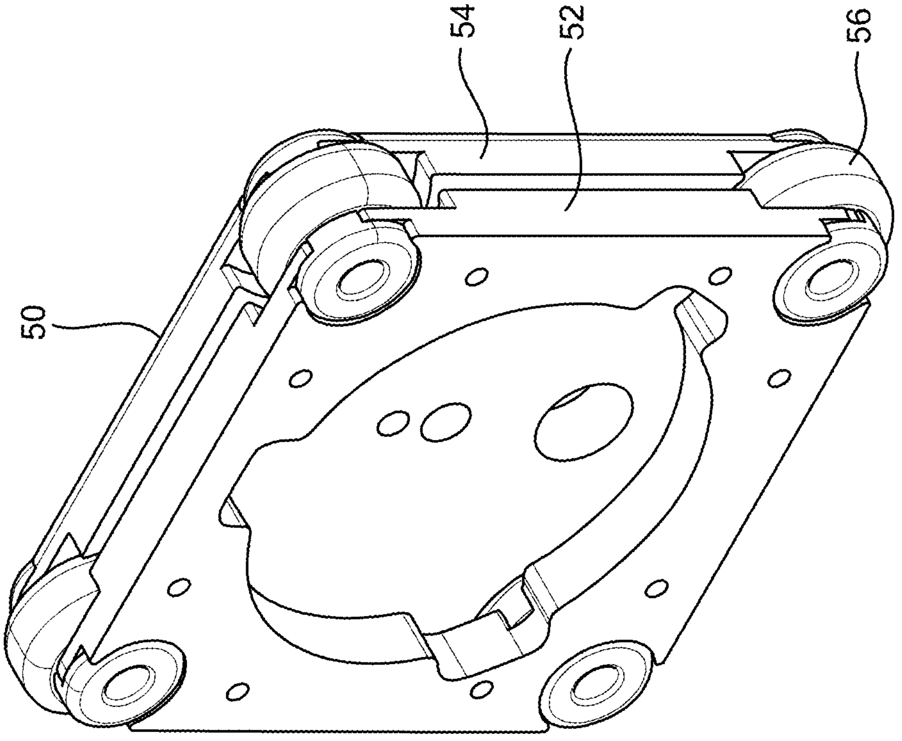
FIG. 8 depicts a vibration dampening back plate that is securable to the second mount element.
Figure 7:
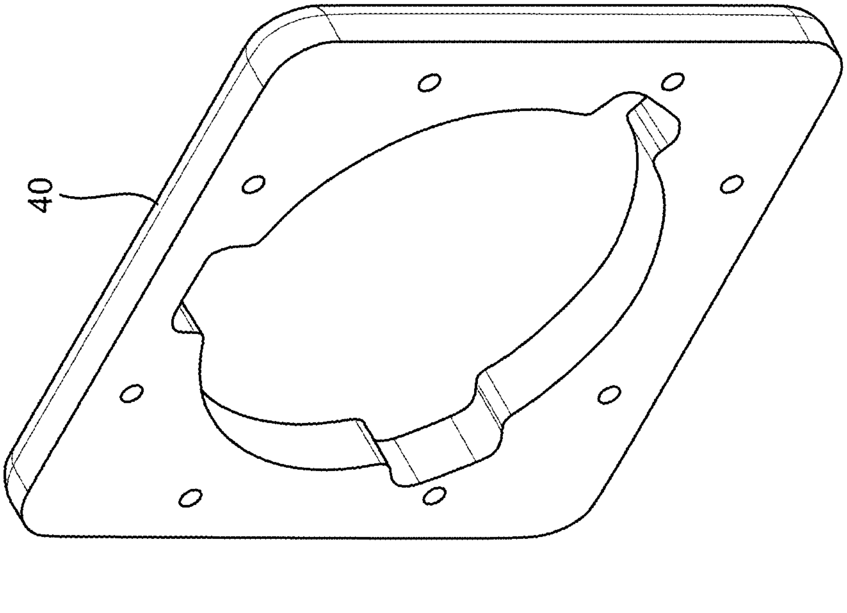
FIG. 7 shows a back plate securable to the second mount element.

Additional mount elements can be secured to the back of the second mount element 26. For example, FIG. 7 shows a basic back plate 40 for applications where vibration is not a significant concern. FIG. 8 shows a mount element 50 that provides vibration dampening. In this example, a first isolating plate 52 is joined to, but vibration isolated from, a second isolating plate 54 with elastomeric/resilient elements 56. Either the second mount element 26 or the additional mount elements 40/50 can be secured to a vehicle interface (not shown).

Figure 10:
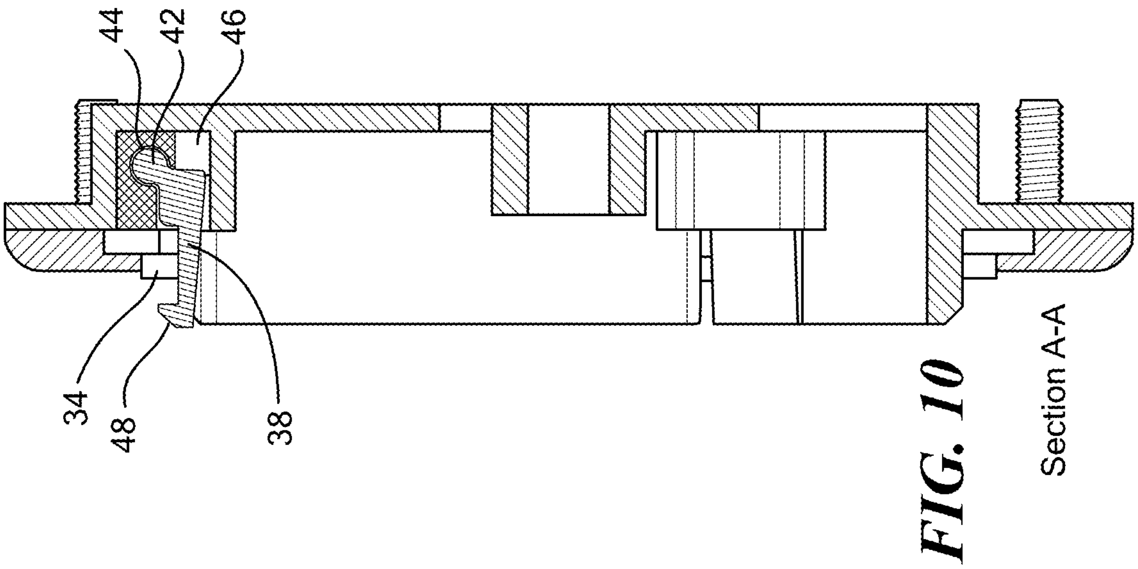
FIG. 10 is a sectional view of the second mount element of FIG. 4, taken along line A-A.
Figure 9:
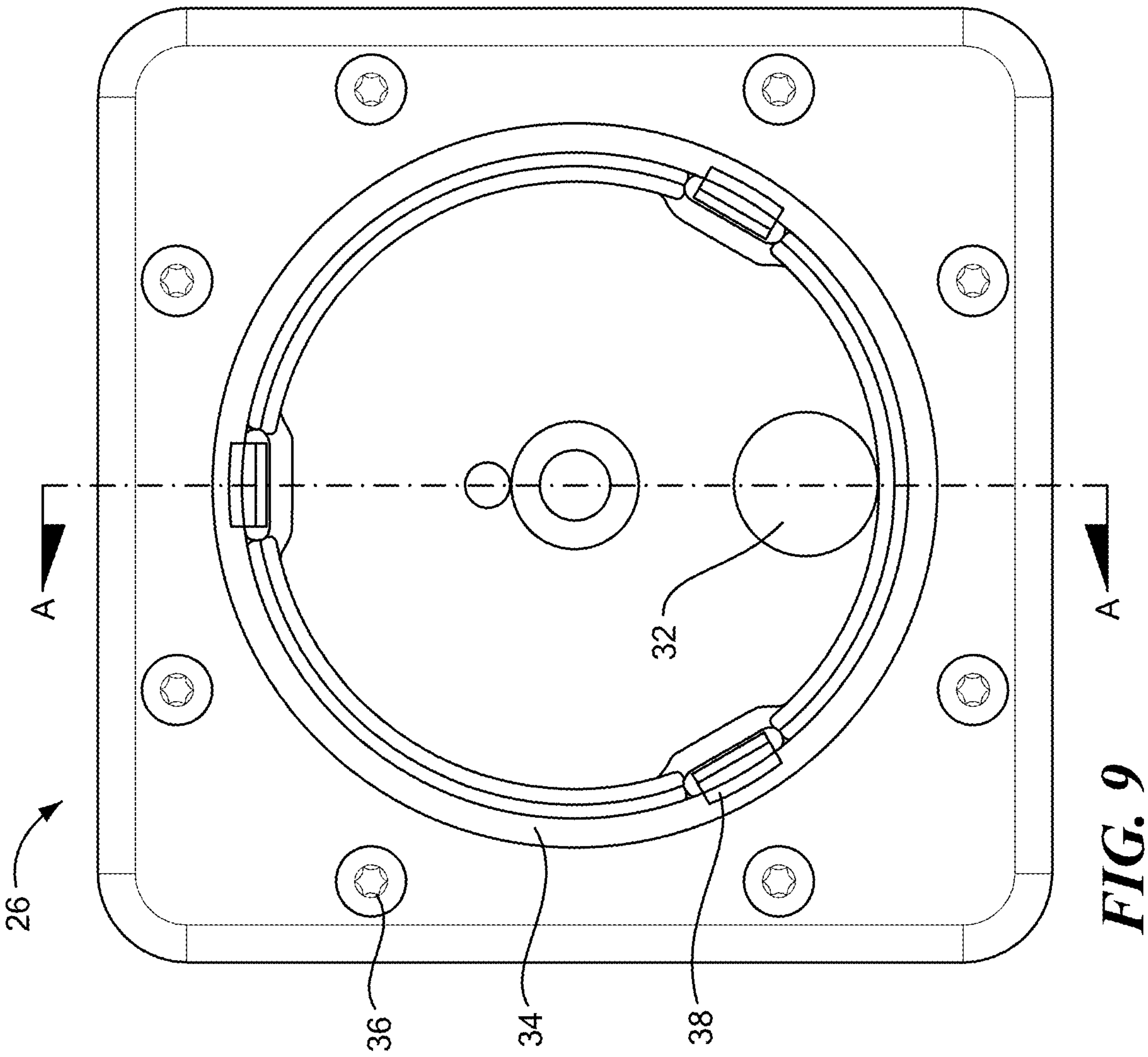
FIG. 9 is a plan view of the second mount element shown in FIG. 4.

Referring now to FIG. 9, a plan view of the second mount element 26 shown in FIG. 4 provides additional details of the flanges 38. Three flanges 38 are shown spaced equally at 120 degrees apart and are shown in the outward position so that the free end of each flange overlaps the lip 34. Referring to FIG. 10, a sectional view of the second mount element 26 of FIG. 4, taken along line A-A, provides details of the flanges 38. A flange 38 is disposed within the second mount element 26 so that a base portion 42 of each flange is in a pocket 44 that retains the base portion while allowing the flange to pivot toward and away from the lip 34. A biasing element 46, such as a spring or an elastomeric element urges the flange outward so that the free end 48 of the flange 38 extends over the lip 34. Inward pressure on the flange 38 moves the flange inward until the free end 48 does not extend over the lip 34. Inward pressure can be applied by the nubs 24 as the first and second mount components 12 and 26, respectively, are moved with respect to each other causing the nubs to align simultaneously with each of the flanges to push them inward simultaneously thereby releasing the first and second mount elements from each other. Conversely, when the first and second mount element are pushed together in any rotational orientation where the nubs are not aligned with the flanges, the flanges push through the aperture and while so doing deflect inward and then are biased outward to move or snap over the lip to secure the first and second mount elements together.

As shown, there are three nubs and three flanges. This allows the phone to be rotated 90 degrees between portrait and landscape orientations without the knubs contacting the flanges and releasing the phone. Rotating the phone 15 degrees outside the portrait to landscape range will release the phone.

As noted above, both mount elements include magnets that are arranged in the corners of a square. These magnets attract each other to index the phone in either portrait or landscape orientation. This prevents the phone from rotating and inadvertently being released from the mount without deliberate action from the user. Deliberate rotation of the phone between the portrait and landscape orientations allows the phone to be released.

Thus, the present mount provides a low-profile for optimal positioning of a phone in vehicles. Magnets center and align the phone when it is inserted onto the mount quickly and easily. Magnets align the phone in either the portrait or landscape orientation. The phone can be rotated between the two orientations easily without removing the phone from the mount. The mechanical locking elements provide strong fixation so that the phone cannot disengage from the mount due to vibration or other forces. The mechanical locking is released by rotating the phone to a specific set of locations so the user can easily remove the phone using one hand. The locking is not released when the phone is moved between portrait and landscape, and the magnets ensure that the phone cannot rotate without deliberate action from the user. Wireless charging and/or vibration dampening can be easily integrated with the mount without significantly increasing the profile of the invention. A wireless charging puck can be held within the mount so that the charging coil of the charging puck is positioned directly adjacent to the phone for maximum charging efficiency.

What is claimed is:

1. A mount for a device having a wireless charging puck, the mount comprising:

a first component defining a circular aperture dimensioned to receive the wireless charging puck, the aperture surrounded by a first plurality of magnets and a first mechanical locking component; and a second component attachable to the first component, the second component defining a receptacle for receiving and retaining the wireless charging puck, the second component including a second plurality of magnets and a second mechanical locking component engageable with the first mechanical locking components, wherein the first and second pluralities of magnets are arranged to index the first and second components into at least two stable angular orientations relative to one another, and wherein rotation between the indexed angular orientations does not disengage the first and second mechanical locking components, and disengagement occurs only when the first and second components are rotated to a non-indexed angular position.

2. The mount of claim 1, wherein the first plurality of magnets is disposed around the circular aperture.

3. The mount of claim 2, wherein the first mechanical locking component is disposed around the circular aperture.

4. The mount of claim 3, wherein the first plurality of magnets includes four magnets disposed 90 degrees apart around the circular aperture.

5. The mount of claim 4, wherein the first mechanical locking component includes a lip that defines the circular aperture.

6. The mount of claim 5, wherein the second plurality of magnets is disposed around the receptacle.

7. The mount of claim 6, wherein the second plurality of magnets includes four pairs of magnets disposed 90 degrees apart around the second receptacle.

8. The mount of claim 7, wherein the second mechanical locking component includes a plurality of flanges disposed between the magnets around the second receptacle.

9. The mount of claim 8, wherein each flange is hinge mounted to the second component and has free ends that can pass through the circular aperture to engage the lip.

10. The mount of claim 9, wherein the flanges are laterally biased toward the lip.

11. The mount of claim 10, wherein the first mechanical locking component includes a plurality of nubs that extend inward toward the circular aperture.

12. The mount of claim 11, wherein the first mechanical locking component includes three nubs, and the second mechanical locking component includes three flanges.

13. The mount of claim 10, wherein the flanges are laterally biased with a spring.

14. The mount of claim 10, wherein the flanges are laterally biased with an elastomeric element.

15. The mount of claim 1, wherein the second component includes vibration dampeners.

16. The mount of claim 1, wherein the receptacle is apertured to allow passage of a wire for the wireless charging puck.

* * * * *